(12) United States Patent
Langston et al.

(10) Patent No.: US 6,623,238 B2
(45) Date of Patent: *Sep. 23, 2003

(54) AIR TURBINE STARTER WITH SEAL ASSEMBLY

(75) Inventors: Todd A. Langston, Chandler, AZ (US); William Lee Giesler, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 93 days.

This patent is subject to a terminal disclaimer.

(21) Appl. No.: 09/841,660

(22) Filed: Apr. 23, 2001

(65) Prior Publication Data

US 2001/0028845 A1 Oct. 11, 2001

Related U.S. Application Data

(63) Continuation-in-part of application No. 09/370,675, filed on Aug. 9, 1999, now Pat. No. 6,318,958.
(60) Provisional application No. 60/097,467, filed on Aug. 21, 1998.

(51) Int. Cl.$^7$ ................................................ F04D 11/02

(52) U.S. Cl. .................. 415/112; 415/113; 415/115; 415/122.1; 415/123; 415/230; 415/231; 416/92; 60/626

(58) Field of Search .................. 415/115, 116, 415/122.1, 123, 124.1, 111–113, 168.1, 168.2, 168.4, 170.1, 173.1, 173.3, 173.5, 174.2, 174.5, 230, 231; 416/95, 96 R, 97 R, 90 R, 92; 277/348, 352, 390, 412, 415, 358, 369, 370, 401; 60/788, 625, 626

(56) References Cited

U.S. PATENT DOCUMENTS

| | | | |
|---|---|---|---|
| 1,773,067 A | | 8/1930 | Ver Planck |
| 1,878,731 A | | 9/1932 | Thompson |
| 2,393,963 A | * | 2/1946 | Berger ................ 416/96 R |
| 2,907,595 A | | 10/1959 | Benson et al. |
| 3,235,269 A | | 2/1966 | Olesen |
| 3,302,951 A | | 2/1967 | Olesen |
| 3,460,843 A | * | 8/1969 | Jaeger ................ 415/170.1 |
| 3,770,179 A | * | 11/1973 | McHugh ................ 277/318 |
| 3,796,507 A | | 3/1974 | Smykal et al. |
| 3,799,559 A | | 3/1974 | Kayser |
| 3,904,211 A | | 9/1975 | Dega |
| 3,989,407 A | | 11/1976 | Cunningham |
| 4,099,727 A | | 7/1978 | Weiler |
| 4,156,342 A | | 5/1979 | Korta et al. |
| 4,189,156 A | | 2/1980 | Geary, Jr. et al. |
| 4,193,603 A | | 3/1980 | Sood |

(List continued on next page.)

FOREIGN PATENT DOCUMENTS

| | | |
|---|---|---|
| GB | 651921 | 4/1951 |
| JP | 59-117957 | 7/1984 |
| WO | PCT/US 02/12984 | 4/2001 |

OTHER PUBLICATIONS

George W. Hosang, Solar Turbines Incorporated, Low Leakage Turbine Shaft Seals for Advanced Combined Cycle Systems; Final Report SR 84–R–4622–36/NTIS ADA 149372, 1–144, Nov., 1984.

*Primary Examiner*—Christopher Verdier
(74) *Attorney, Agent, or Firm*—Robert Desmond, Esq.

(57) ABSTRACT

An air turbine starter with an improved seal assembly is provided. A fluid conduit or channel allows higher pressure fluid into one side of a bearing seal. For example, the seal assembly may include a face seal, and a second seal forming a chamber therebetween and a flow passage opens into the chamber for exposing the chamber to the higher pressure.

45 Claims, 8 Drawing Sheets

U.S. PATENT DOCUMENTS

| | | | |
|---|---|---|---|
| 4,196,910 A | 4/1980 | Aiuz | |
| 4,257,617 A | 3/1981 | Hill | |
| 4,268,229 A | 5/1981 | Berg | |
| 4,709,545 A | 12/1987 | Stevens et al. | |
| 4,779,413 A | 10/1988 | Mouton | |
| 4,804,196 A | * 2/1989 | Readman | 277/390 |
| 4,997,340 A | 3/1991 | Zinsmeyer et al. | |
| 5,003,767 A | 4/1991 | Rodgers | |
| 5,039,115 A | 8/1991 | Herbert et al. | |
| 5,042,963 A | 8/1991 | Sorenson et al. | |
| 5,129,782 A | 7/1992 | Ruetz | |
| 5,160,005 A | 11/1992 | Burch | |
| 5,174,582 A | * 12/1992 | Ferguson | 415/174.5 |
| 5,412,977 A | 5/1995 | Schmohl et al. | |
| 5,454,689 A | 10/1995 | Falavigna | |
| 5,489,190 A | 2/1996 | Sullivan | |
| 5,538,258 A | 7/1996 | Hager et al. | |
| 5,619,850 A | 4/1997 | Palmer et al. | |
| 5,692,756 A | 12/1997 | Altieri | |
| 5,755,445 A | 5/1998 | Arora | |
| 5,941,532 A | 8/1999 | Flaherty et al. | |
| 6,004,037 A | 12/1999 | Harris et al. | |
| 6,257,589 B1 | 7/2001 | Flaherty et al. | |
| 6,318,958 B1 | 11/2001 | Giesler et al. | |
| 6,330,790 B1 | 12/2001 | Arora et al. | |

* cited by examiner

AIR TURBINE STARTER WITH SEAL ASSEMBLY

CROSS REFERENCE TO RELATED APPLICATIONS

This application is a continuation-in-part of Ser. No. 09/370,675, filed Aug. 9, 1999, now U.S. Pat. No. 6,318,958, which claims priority to provisional application Serial No. 60/097,467, filed Aug. 21, 1998.

TECHNICAL FIELD

These inventions relate generally to seals for turbines and have particular application to air turbine starters and to seals used in such starters.

BACKGROUND OF THE INVENTION

An air turbine starter is a device used to start a turbine engine, such as an aircraft jet engine. The air turbine starter is mounted by the jet engine, much as a starter for an automobile is located by the automobile's engine. In order to start the jet engine, the air turbine starter is activated. The applicant for the present invention, Honeywell International, Inc., has for years successfully designed, developed and manufactured air turbine starters.

Referring to the drawings, FIG. 2 shows a prior art turbine face seal used in air turbine starters. The face seal includes a rotor 2 mounted to shaft 24 adjacent a bearing 26. The rotor 2 has an axially facing flange 3. The face seal further includes a stator 4 mounted to turbine exhaust housing 27. Disposed between the rotor 2 and the stator 4 is a carbon ring 5 that engages the flange 3 to form a seal. In a typical air turbine starter such the ATS 100 shown in FIG. 1, the rotation of the turbine wheel 22 can generate under certain circumstances a low pressure or "vacuum" on the downstream side of the wheel which is also the airside of the turbine seal. This differential pressure may result in large oil leakage rates if the turbine seal has any flaws or coke build up in the contact zone. The coke build-up destroys the flatness of the sealing contact surfaces between the rotor and the seal carbon ring. In particular, the coke can separate the two surfaces resulting in a clearance therebetween. As a result, an air/oil mist may be pulled from the bearings through the seal and into the turbine exhaust air. If 100 to 300 cubic centimeters (cc) of oil is displaced to the turbine exhaust air without detection by the pilot or ground crew, loss of the air turbine starter by turbine bearing failure is possible. While this air turbine starter has acceptable reliability and generally functions as desired, the sensitivity of the starter design to turbine seal flaws can result in significant maintenance expenses and downtime for the starter.

SUMMARY OF THE INVENTIONS

The present inventions provide an improved turbine and an improved bearing seal for turbines, such as may be used with an air turbine starter or with other turbine applications. In one or more aspects of the present inventions, a more reliable turbine seal is provided which can be easily put in place and may provide longer in service time before routine maintenance. The turbine seal may also be easily retrofit on a number of turbine configurations, with a limited amount of added structure. The improved turbine seal may use existing turbine configurations to produce a pressure differential across an existing turbine seal to reduce the amount of oil or other fluid leakage that might otherwise occur around the existing seal. It may also reduce the pressure on the contacting surfaces of the bearing seal, reducing heat and coke build up, and in the process increase the lifespan of the seal.

In one form of one aspect of the present inventions, a turbine starter assembly having a turbine wheel includes a seal for sealing around a turbine shaft downstream from the turbine wheel. A fluid conduit extends from a higher pressure area to a downstream side of the turbine wheel and to a point at an upstream side of the seal so that fluid pressure at the upstream side of the seal is greater than the fluid pressure on the downstream side of the seal. The higher pressure area would be an area where a pressure exists that is sufficiently higher than the pressure at the downstream side of the seal that a positive pressure differential is created from the upstream side of the seal to the downstream side of the seal. For example, the higher pressure area could be an inlet side of the turbine wheel, such as the turbine inlet or the buffer region behind a turbine shield. Other areas may also be used.

In another form of one aspect of the present inventions, a turbine assembly having a turbine wheel includes a seal for sealing around a turbine shaft downstream from the turbine wheel. A fluid conduit extends from an upstream side of the turbine wheel to a downstream side of the turbine wheel and to a point at an upstream side of the seal so that fluid pressure at the upstream side of the seal is greater than the fluid pressure on the downstream side of the seal. Preferably, there is a positive pressure differential from the upstream to the downstream side of the seal so that fluid flow would tend to be from the upstream side of the seal to the downstream side of the seal. In one preferred aspect of the inventions, an oil seal is downstream from the turbine wheel at approximately atmospheric pressure and the conduit feeds higher pressure air to the upstream side of the seal.

In another form of another aspect of one of the present inventions, a turbine has a turbine wheel with an upstream side and a downstream side and a turbine shaft for supporting the turbine wheel for rotation. A bearing is positioned about the turbine shaft and a seal is placed adjacent the bearing. A conduit extends from the upstream turbine wheel side to a point on the side of the seal opposite the bearing for providing a positive pressure differential across the seal from the conduit toward the bearing. In one preferred embodiment, a bore is formed in the front of the turbine wheel and extends along a central axis of the turbine wheel. A second bore is formed to extend from the first bore to a point external to the turbine wheel and the turbine shaft on the downstream side of the turbine wheel. Higher pressure air can then be shunted to the seal.

In a further form of another aspect of one of the present inventions, a method is provided for creating a pressure differential across a seal. A first bore is formed in a turbine wheel and a second bore is formed in the turbine wheel intersecting the first bore wherein the first bore opens on an upstream side of the turbine wheel and the second bore opens on a downstream side of the turbine wheel. In one preferred embodiment, the turbine wheel is supported through a set of bearings about a turbine wheel shaft and the bearings are sealed by a first seal. A second seal is provided on a side of the second bore opposite the first seal to provide a space or cavity for maintaining a pressure in the cavity higher than a pressure on the opposite side of the first seal. This method can be used to produce an improved seal for a turbine assembly that reduces oil leakage from the seal adjacent the bearing.

The seal may be disposed between the turbine and the housing. The seal assembly comprises a face seal, a non-contacting seal axially spaced therefrom to define an air filled annular chamber therebetween and a flow passage having an exit fluidly communicating with said chamber and an inlet fluidly communicating with a source of air.

The air filled chamber acts as a buffer separating the differential pressure generated by pumping of the turbine from the face seal. Thus if the face seal develops a flaw (due to coke build up on the contact face or grain pull out from the carbon face) the seal leakage is low even if the sealing faces separate.

In a further aspect of another of the present inventions, a turbine wheel may be provided that has a flow channel, conduit or other flow configuration that extends from a front face or other upstream portion of the turbine wheel to a downstream portion of the turbine wheel, so that air or other suitable fluid can pass through the turbine wheel. With this turbine wheel, conventional air turbine starters, for example, can be rebuilt, and new air turbine starters can be built incorporating one or more aspects of the present inventions. Additionally, the turbine wheel incorporating the conduit described herein can be included as a kit. In a preferred embodiment, the kit includes the turbine wheel having a first channel formed in the first face of the turbine wheel and a second channel extending from the first channel to the outside surface of the turbine wheel, such as at the hub surface, between the turbine wheel and the turbine shaft. A kit may also include other components that may be considered necessary to properly install the turbine wheel for its intended purpose, and such additional components may include a seal assembly, fasteners, and the like.

These and other features and advantages of the present inventions are set forth in the following detailed description of a preferred embodiments when read in conjunction with the accompanying drawings.

DESCRIPTION OF THE PREFERRED EMBODIMENTS

Figure 1:
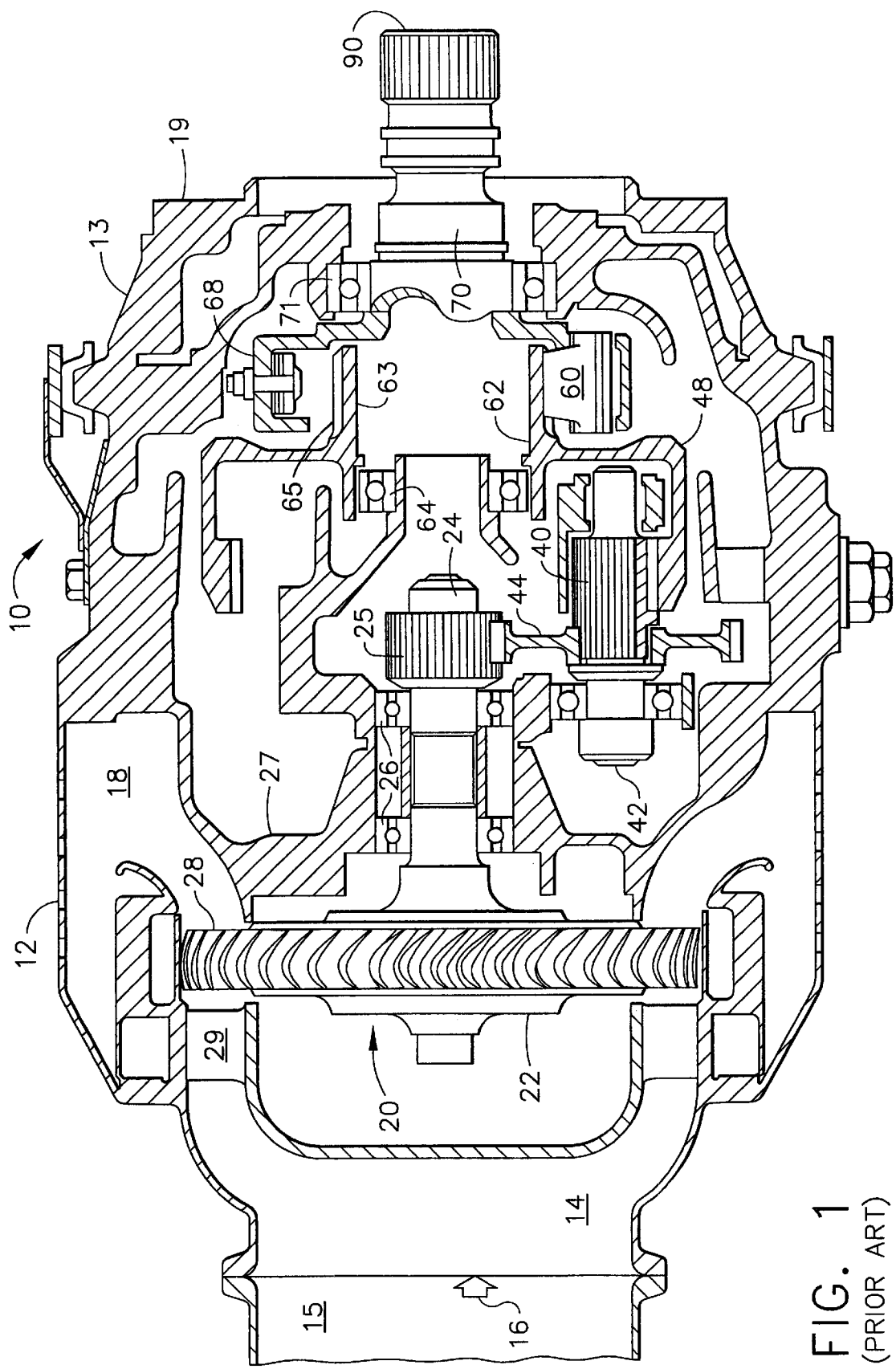
FIG. 1 presents a plan cross-sectional view of an Allied-Signal air turbine starter having the designation ATS 100.
Figure 2:
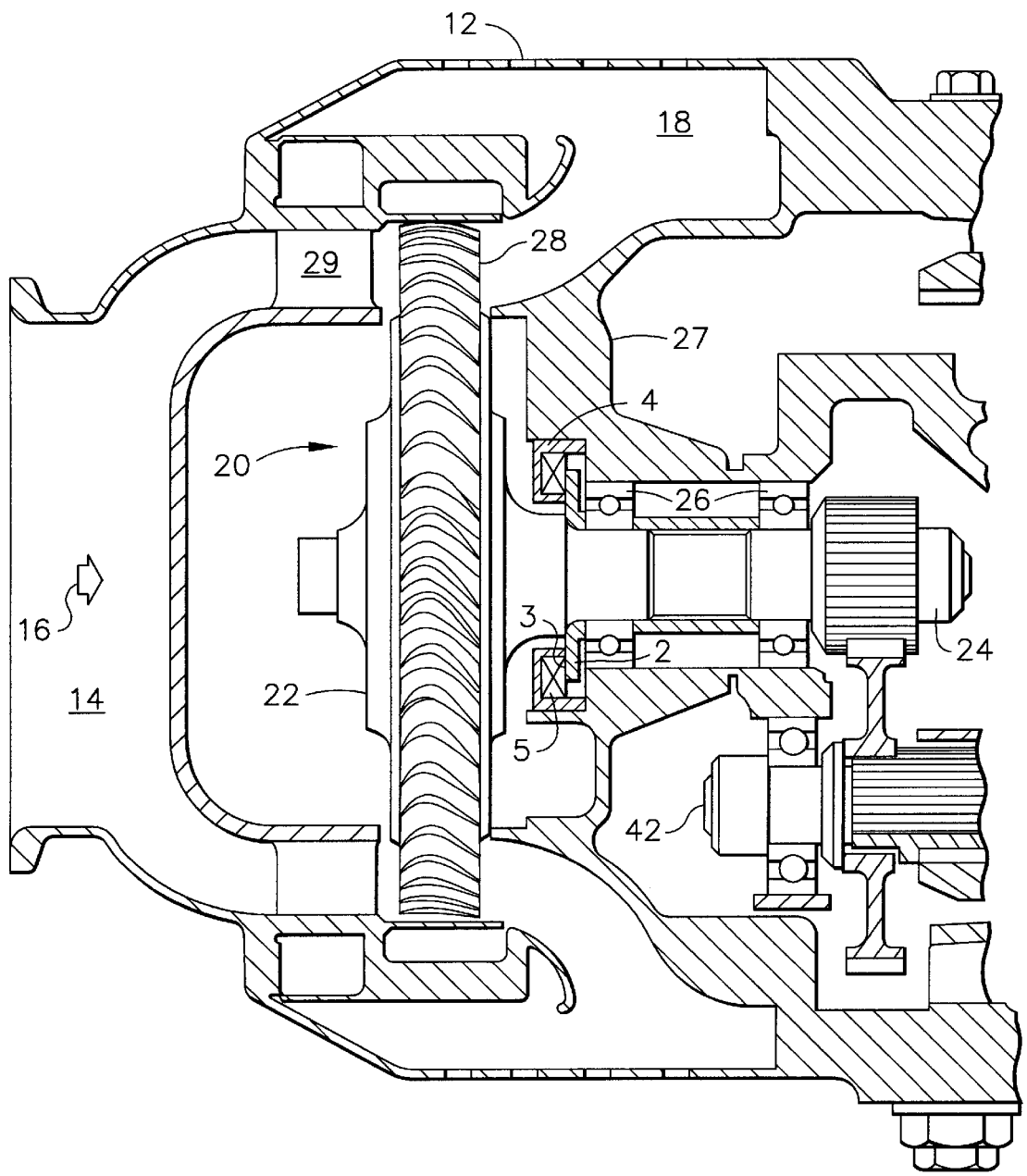
FIG. 2 is a blow-up of the turbine section of the air turbine starter of FIG. 1 with a prior art turbine seal.

Referring to the drawings, FIG. 1 shows an air turbine starter 10 embodying the present invention. The air turbine starter 10 has a first housing assembly 12 and a second housing assembly 13. The housing assembly 12 defines a flow path 14 extending from an inlet 16 to an outlet 18. The housing assembly 13 includes a mounting flange 19 for mounting the air turbine starter to an aircraft engine (not shown). An air pressure duct 15 delivers pressurized air from an air supply to the inlet 16. Typically, the air pressure at the inlet 16 is in the range of 30–40 psig.

Within the air turbine starter 10, the housing assemblies 12 and 13 support a turbine section 20, a compound planetary gear train 40, and an overrunning clutch 60.

The turbine section 20 is comprised of a turbine wheel 22 having a rotatable shaft 24 extending therefrom, journaled by bearings 26 to a turbine exhaust housing 27, which is part of housing 12. A gear 25 secured to the shaft 24. A plurality of turbine blades 28 are circumferentially mounted to the turbine wheel 22 and are positioned within the flow path 14. Upstream of the blades 28 are a plurality of nozzles 29 mounted to the housing assembly 12 which provide the proper flow angle to the air flow before it enters the turbine blades 28. In operation, pressurized air entering through inlet 16 is properly aligned by the nozzles 29 and is then expanded across the blades 28 before exiting through outlet 18. The blades 28 convert the pressure energy of the air into rotary motion causing the turbine wheel 22, the shaft 24 and the gear 25 to rotate at the same speed as the blades 28.

The compound planetary gear train 40 is comprised of a plurality of shafts 42 each having a gear 44 that meshes with the gear 25. The gear 44 engages a portion of the shaft 42, a ring gear 48 and a hub gear 62, which is the input side of the overrunning clutch 60. In operation, the gear train 40 converts the high speed, low torque output of the turbine section 20 into low speed, high torque input for the clutch 60.

The clutch 60 is a pawl and ratchet type clutch. The clutch 60 has the hub gear 62 on its input side and a clutch drive shaft 70 on its output side. The hub gear 62 has a hollow cylindrical hub portion 63, which is supported on a bearing 64 and has a ratchet 65 circumferentially positioned along its external surface. Adjacent to the hub gear 62 is a hollow drive shaft assembly comprising a clutch housing 68 integral with a clutch drive shaft 70, and mounted on bearing 71 for rotation. A portion of the drive shaft 70 extends beyond the housing 13 and has an air turbine starter output shaft 90 mounted thereon. The output shaft 90 can be coupled, for example, to a starter pad on the gearbox of a gas turbine engine, (not shown).

Figure 3:
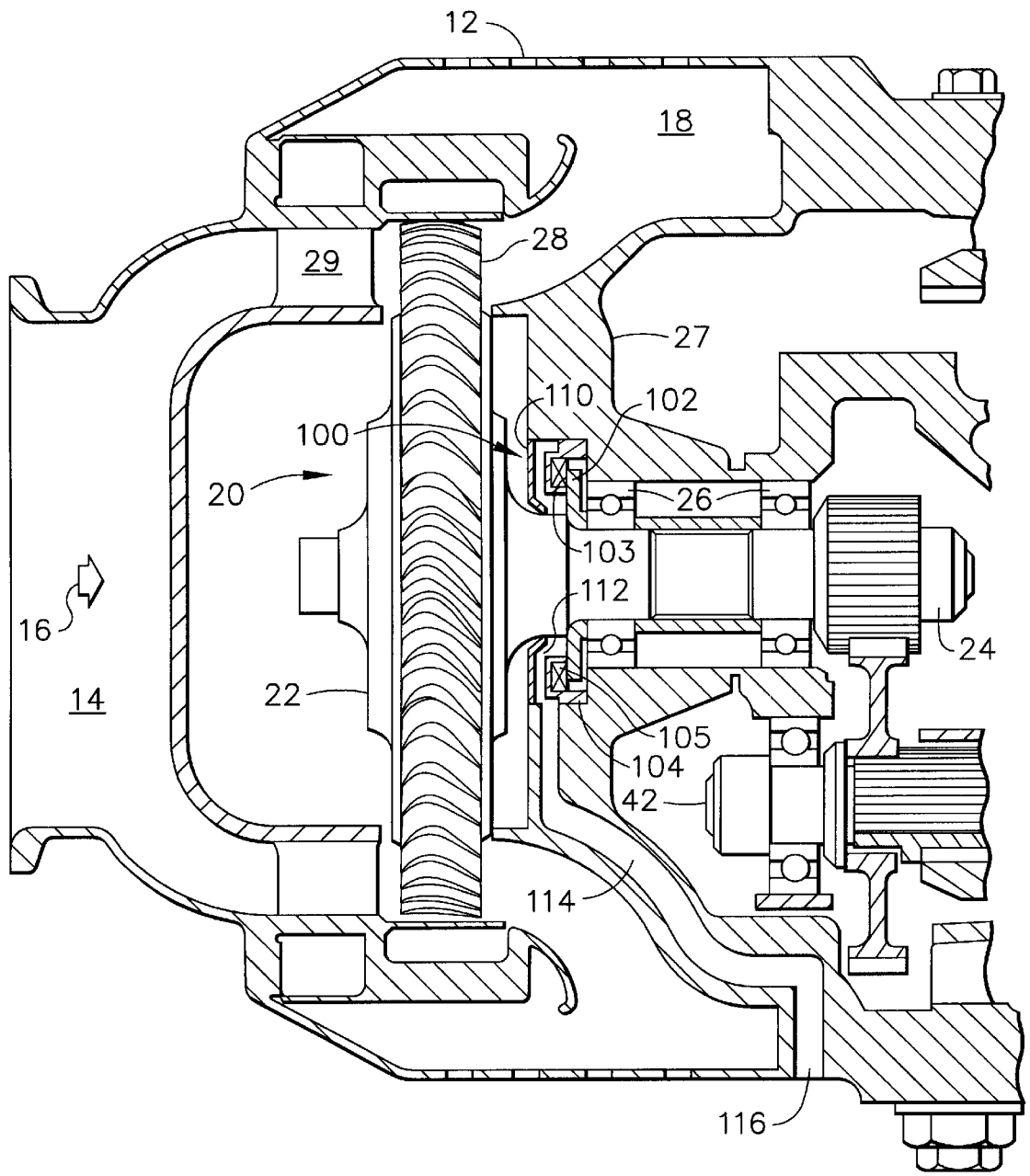
FIG. 3 is a blow-up of the turbine section of the air turbine starter of FIG. 1 with a turbine seal contemplated by the present invention.
Figure 4:
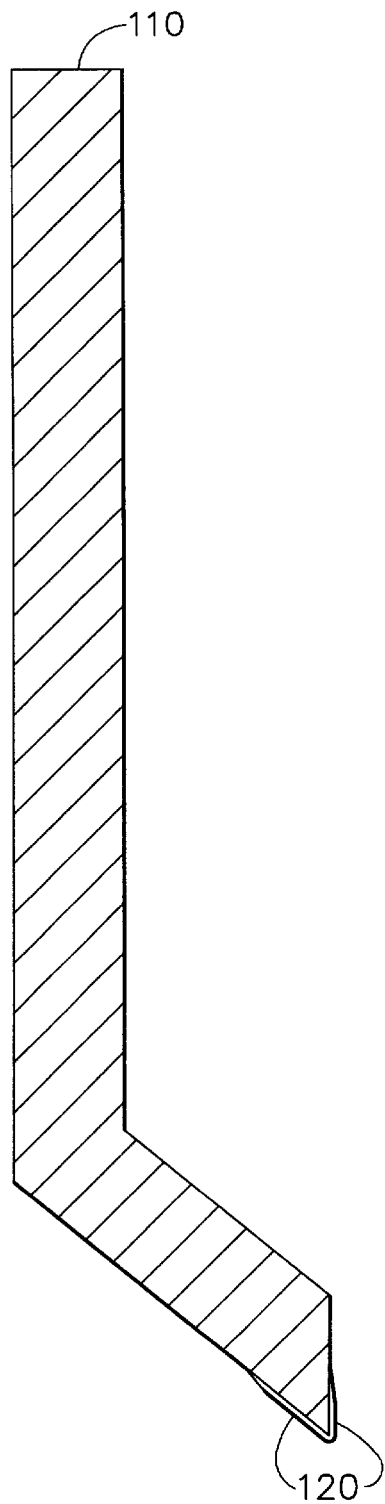
FIG. 4 is a partial cross-sectional view of the air-to-air seal of the seal assembly contemplated by the present invention.

Referring to FIG. 3, a turbine seal assembly 100 includes a face seal having a rotor 102 mounted to shaft 24 adjacent a bearing 26. The rotor 102 has an axially facing flange 103. The face seal further includes a stator 104 mounted to turbine exhaust housing 27. Disposed between the rotor 102 and the stator 104 is a suitable seal 105, for example a carbon seal ring that sealing engages the flange 103. The seal 105 can take any number of configurations suitable for sealing the bearing, and for example, it can alternatively be a hydrodynamic enhanced carbon face seal such as disclosed in 1) U.S. Pat. No. 5,941,532, or 2) a spiral groove, or 3) a Rayleigh pad design (see, FIG. 25 on pg. 37 of Solar Turbines Incorporated report SR84-R-4622-36 NTIS ADA149372, November 1984, for an example of a spiral groove hydrodynamic seal), the disclosures of which patent and report are incorporated herein by reference. The life of a hydrodynamic seal can be significantly improved by reducing or eliminating the differential pressure across the seal that causes oil to reach and fill up the hydrodynamic features during operation. The assembly 100 further includes an air-to-air seal 110 disposed on the air side of the stator 104 and axially spaced therefrom to define an annular chamber 112. The air-to-air seal 110 is typically a non-contacting clearance gap type seal and extends radially inwardly from the turbine exhaust housing 27 to a radially inner tip that seals against a radially outward facing surface of the wheel 22. In the preferred embodiment, the seal 110 is a labyrinth seal with the inner tip being a single knife-edge. In alternative embodiments, the inner tip could be a multiple knife edges with or without abradeable contact zones 120 such as honeycomb or soft plasma sprayed high porosity coatings. In other embodiments the seal 100 can be a lip seal, clearance floating ring seal, an arch bound floating ring seal, static long bushings, static short bushings, wind backs, either outside diameter or inside diameter contacting piston rings, floating rotating free rings, brush seals, or face seals. These seals can be oriented in either the radial or axial plane. If a lip seal is used it should be a contacting seal where the contact lip is allowed abrade to a line-to-line fit to a clearance after rotation of the turbine wheel. The lip seal may be filled with polytetrafluoroethylene (Teflon®), nylon or plastics, or rubber.

Air is brought to chamber 112 through a flow passage 114. In the preferred embodiment, the inlet 116 of the passage 114 receives ambient air surrounding the air turbine starter 10. Alternatively, the inlet 16 can be located in the exhaust duct 18 or at the flange 19 where the starter 10 is coupled to the engine. In another embodiment, high pressure from duct 15 can be directly ducted to the inlet 16, or the pressure in the air can be regulated with a reduction orifice or pressure regulated air supply. The flow passage 114 can be formed in a number of ways such as by tubing, annular passages, or cast-in chambers and/or tubes. Importantly, the flow area of the flow passage 114 needs to be larger than the maximum flow area of the air-to-air seal 110 so that the acceleration of the air at the air-to-air seal absorbs the turbine wheel disk centrifugal pressure generation leaving no differential pressure across the face seal. Preferably, the flow area of the flow passage 114 is at least three times larger than the flow area of the air-to-air seal 110.

The redundant air-to-air turbine seal assembly 100 reduces the system's sensitivity to flaws in the turbine seal by eliminating the differential pressure across the seal. Because the chamber 112 provides a buffer section separating the differential pressure from the turbine wheel pumping from the turbine seal, if the seal develops a flaw (due to coke build up on the contact face or grain pull out from the carbon face) the seal leakage is low even with the two faces of the face seal separate. The elimination of the differential pressure across the seal also reduces the pressure loading of the carbon face or eliminates the requirement for a more expensive and larger envelope package pressure balanced carbon face seal.

In another aspect of one of the present inventions, a more reliable seal for a turbine is provided, such as may be used in air turbine starters or other turbine equipment. Turbine seal leakage can be reduced by porting buffer air from the upstream side of the turbine wheel to produce a positive pressure to the air side of the turbine seal. A slightly higher buffer pressure is provided to the air side of the seal relative to the oil side of the seal, so that any leak path will be air leaking into the oil side rather than oil leaking out to the air side. The positive pressure can be provided using less additional structure, which also benefits retrofitting of existing turbine designs.

One method for porting buffer air to the seal includes drilling or tapping a hole or bore into a center of the turbine wheel and a second hole or bore radially from the first hole to the seal area. Preferably, the first hole extends along the center of the turbine wheel a distance long enough to allow the second hole to reach the seal area while short enough to still maintain the integrity of the turbine wheel and shaft. The second hole is substantially radial but can have other configurations and directions, for example if the first hole is made shorter. The configurations of the first and second holes may be provided as desired to accomplish the desired air flow characteristics, including pressure, velocity and the like. While it is not necessary, an expansion orifice can be provided to regulate the air flow characteristics, such as by controlling the opening to the first hole. In the preferred embodiment, the seal is configured so that there is an approximately 2 psi pressure difference across the oil seal, with the air side being at a higher pressure than the oil side of the seal. The range of usable differential pressures is approximately 0.5 psi to 100 psi. The sizes and other parameters for configuring the holes, bores or ports are preferably selected to provide the desired pressure differential. More than one radial hole can be used if desired, and more than one axial hole can be used as well.

Figure 5:
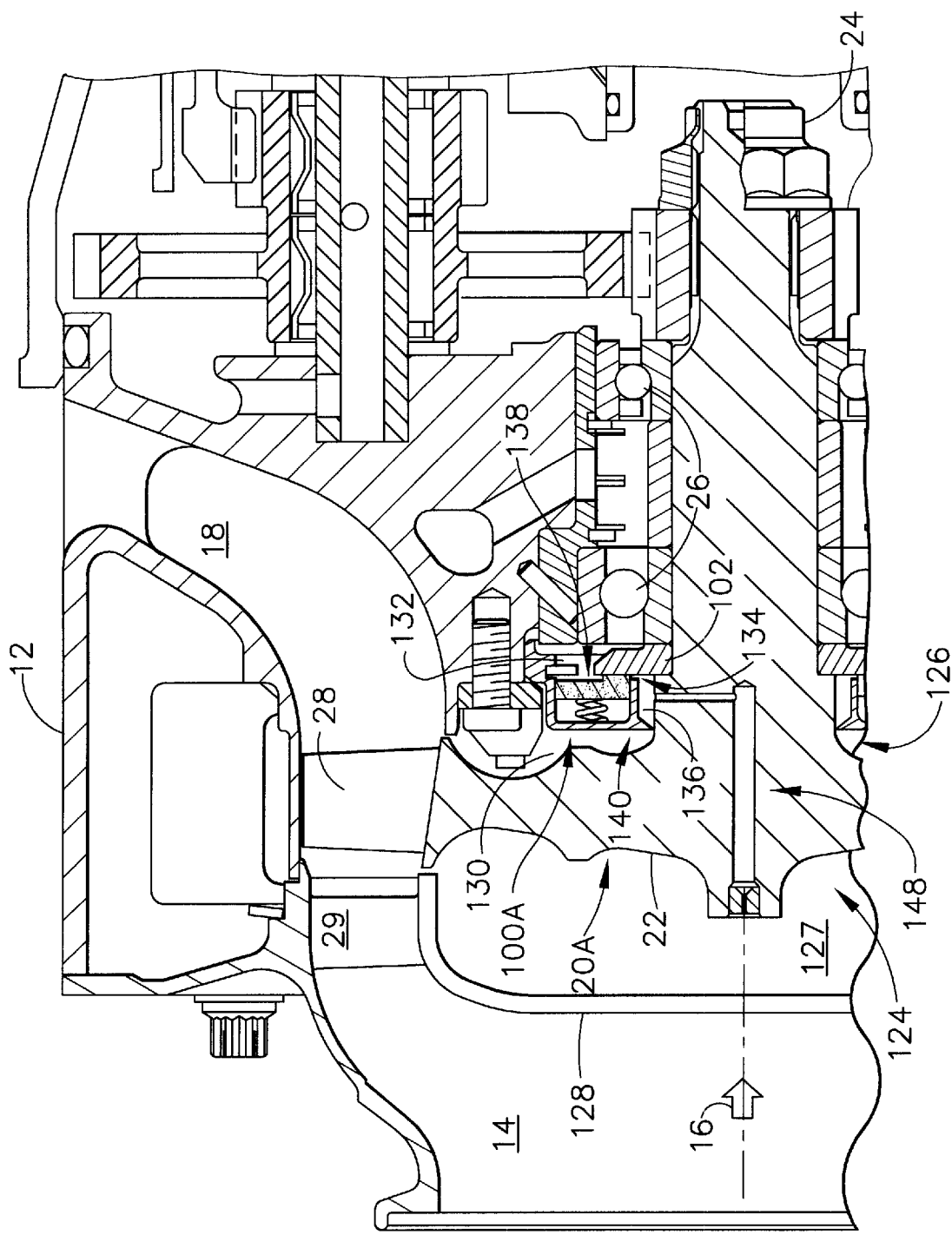
FIG. 5 is an enlarged side sectional view of a turbine section with a seal in accordance with another aspect of one of the present inventions.

Considering another aspect of one of the present inventions in more detail, a portion of a turbine 122 is shown in FIG. 5, where identical elements are numbered identically. The turbine includes a turbine section or assembly 20A with the turbine wheel 22 supported on the turbine shaft 24 and having an upstream side 124 and a downstream side 126. The upstream side is generally exposed to relatively high pressure air, such as at 20–30 psia, in a buffer region 127 behind a turbine shield 128, while the blades 28 of the turbine wheel are exposed to compressed inlet air at about 40–60 psia. The downstream side 126 is generally exposed to lower pressure air such as exhaust air in the exhaust 18 which may be at about 13 psia or closer to ambient at about 15 psia. In the region 130 on the downstream side of the turbine wheel 22 and adjacent the turbine seal assembly 100A, the pressure may be as low as 10 psia. Without buffer air, oil from the seal may tend to leak from the higher pressure area 132 downstream from seal 102 to the relatively lower pressure area 130.

The seal assembly 100A seals around the turbine shaft downstream from the turbine wheel and includes an upstream side 134 in a buffer cavity 136 and a downstream side 138 in the lower pressure area 132. The fluid pressure at the upstream side 134 is preferably made higher than the fluid pressure at the downstream side 138, as described more fully below, so as to generate a positive pressure differential from the upstream side 134 toward the downstream side 138.

The seal assembly 100A also preferably includes a second seal 140, which may be identical or similar to the air-to-air seal 110 described previously, between the turbine wheel and the first seal or face seal 142, which may be identical or similar to the face seal described above having a seal ring 144. The second seal 140 may include a knife edge 146 similar or identical to the knife edge previously described. The second seal 140 may also include multiple knife edges. The second seal 140, part of the turbine wheel and the rotor 102 help to define the buffer cavity 136 in which a higher pressure may be developed relative to the pressure on the downstream side 138 of the first seal 142 to produce the positive pressure differential from the upstream side 134 toward the downstream side 138.

Figure 7A:
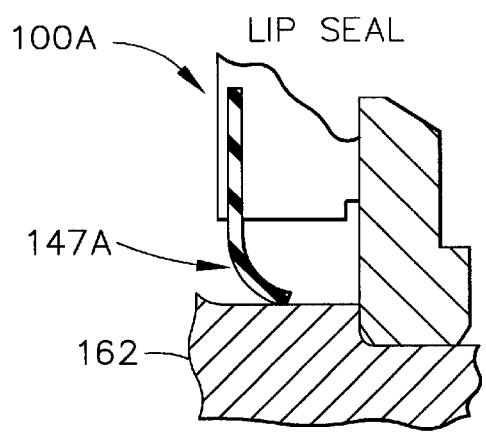
FIGS. 7A–7F are examples of seals that can be used in the turbine section of FIG. 5.
Figure 7B:
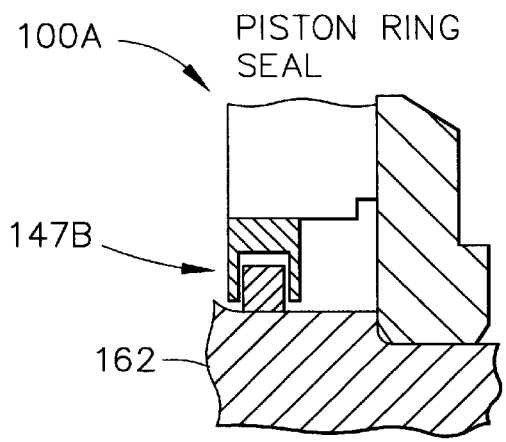
Figure 7C:
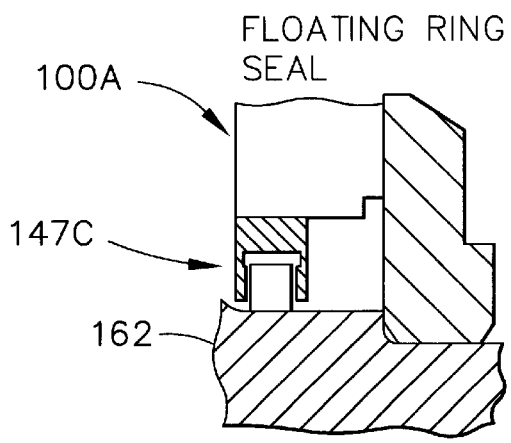
Figure 7D:
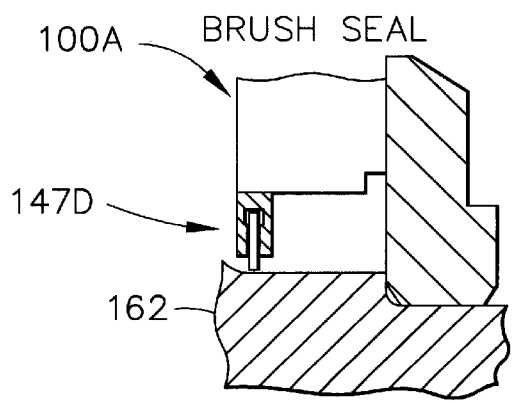
Figure 7E:
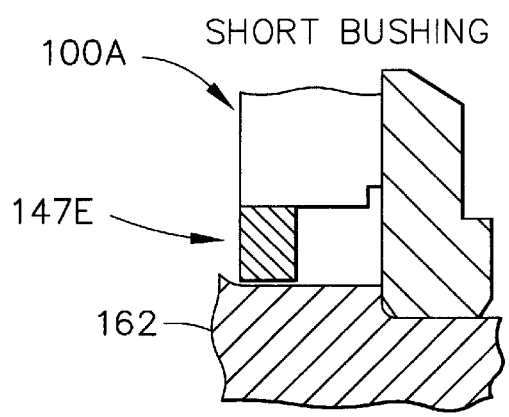
Figure 7F:
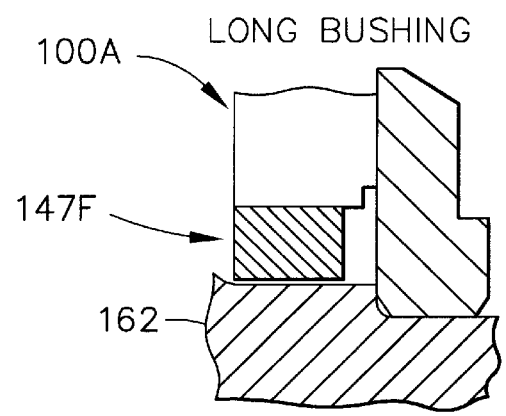

The second seal 100A can also take a number of other forms, such as those shown in FIGS. 7A–7F. For example, the second seal 100A can include a lip seal 147A (FIG. 7A) for sealing against part of the turbine wheel or shaft. The second seal 100A can also take the form of a piston ring seal 147B (FIG. 7B), such as an outside or inside contacting piston ring seal, or a floating ring seal 147C (FIG. 7C), such as a clearance floating ring seal or an arch bound floating ring seal. Alternatively, the second seal 100A can include a brush seal 147D, or a bushing seal, such as a short static bushing seal 147E or a long static bushing seal 147F (FIGS. 7D–7F, respectively). Other possible seal configurations may include a face seal as well as other seal configurations.

A conduit 148 is formed between a high-pressure area, such as the buffer region 127, and the buffer cavity 136 so that the fluid pressure at the air side or the upstream side of the seal 142 is greater than the fluid pressure on the oil side or downstream side of the seal 142, thereby creating a positive pressure differential from the upstream to the downstream side of the seal. The conduit can be formed in any number of ways, in any number of locations in the turbine and relative to the turbine wheel, and can take any number of configurations. In one preferred embodiment, the fluid conduit extends from the upstream side 124 of the turbine wheel to the downstream side 126 of the turbine wheel and into the cavity 136 to create the desired pressure differential. The pressure differential across the face seal is preferably about 2 psi, and can range from less than 0.5 psi to more than 100 psi, but is preferably between 2 and 4 psi. The pressure is preferably higher on the air side of the seal and lower on the oil side of the seal.

Figure 6:
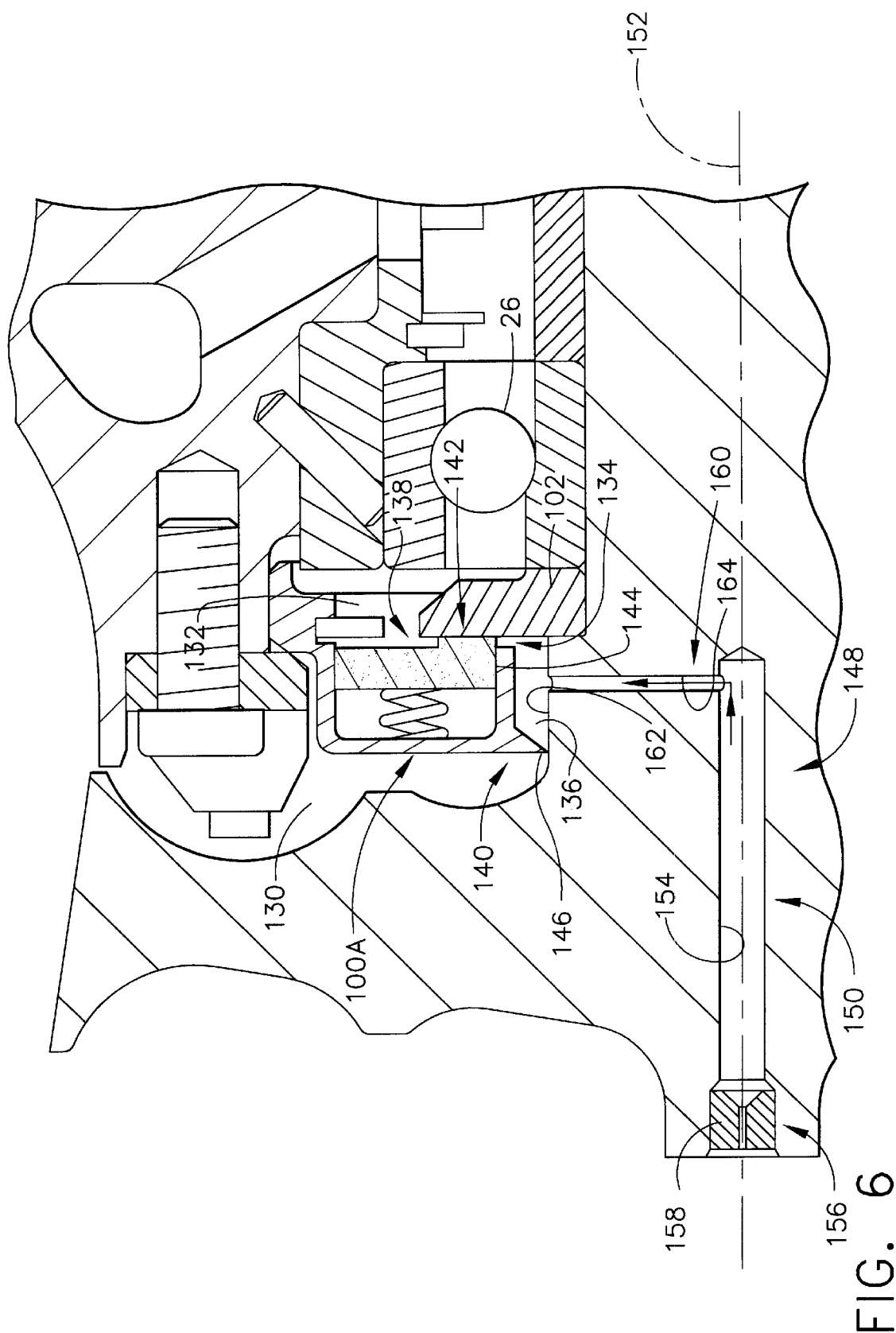
FIG. 6 is an enlarged side sectional view of the seal of FIG. 5.

Referring to FIG. 6, the fluid conduit 148 preferably extends through part of the turbine wheel from a higher pressure area such as the buffer region 127 to the buffer cavity 136. In one preferred embodiment, the conduit includes a first bore 150 formed in the upstream face of the turbine wheel along a central axis 152, and preferably far enough in the downstream direction along axis 152 to allow easy access from the first bore 150 to the buffer cavity 136. The first bore is preferably short enough to minimize any effect the bore would have on the structural integrity of the turbine. The first bore 150 is defined by a first wall 154 which is preferably circular in cross-section forming a substantially right circular cylinder along the entire length of the bore and having a substantially constant diameter and cross-sectional area. In the embodiment shown in FIGS. 5 and 6, the upstream end 156 of the first bore includes an expansion orifice 158, which may be used to regulate, limit or otherwise control air flow characteristics or conditions through the conduit. The expansion orifice 158 can also be omitted in favor of defining the air flow characteristics or conditions through the desired dimensions and configurations of the conduit itself.

The conduit also preferably includes a second bore 160 extending from the first bore 148 to the buffer cavity 136, from approximately the center line 152 to an outer circumferential surface 162 of part of the turbine wheel. The second bore 160 preferably extends exactly radially outward from a central axis 152 to the buffer cavity 136. The second bore can also extend in other directions, as desired, and more than one bore can be formed to port the higher pressure air to the buffer cavity 136. The second bore 160 is defined by a second wall 164 which is preferably circular in cross-section forming a substantially right circular cylinder along the entire length of the second bore and having a substantially constant diameter and cross-sectional area, and the diameter of the second bore can be less than, the same as or greater than the diameter of the first bore. The air flow characteristics or conditions in the second bore can be defined by the desired dimensions and configurations of the second bore. The first and second bores thereby form a conduit through the turbine wheel, part of which extends along the central axis and part of which extends radially from the axis.

The conduit reduces leaking about turbine seals, in the preferred embodiment, by porting buffer air from the upstream side of the turbine wheel to one side of the seal so that a positive pressure differential exists across the seal. The conduit can be easily established with a relatively small number of additional parts, and retrofits are also made easier with the preferred form of the conduit.

Figure 8:
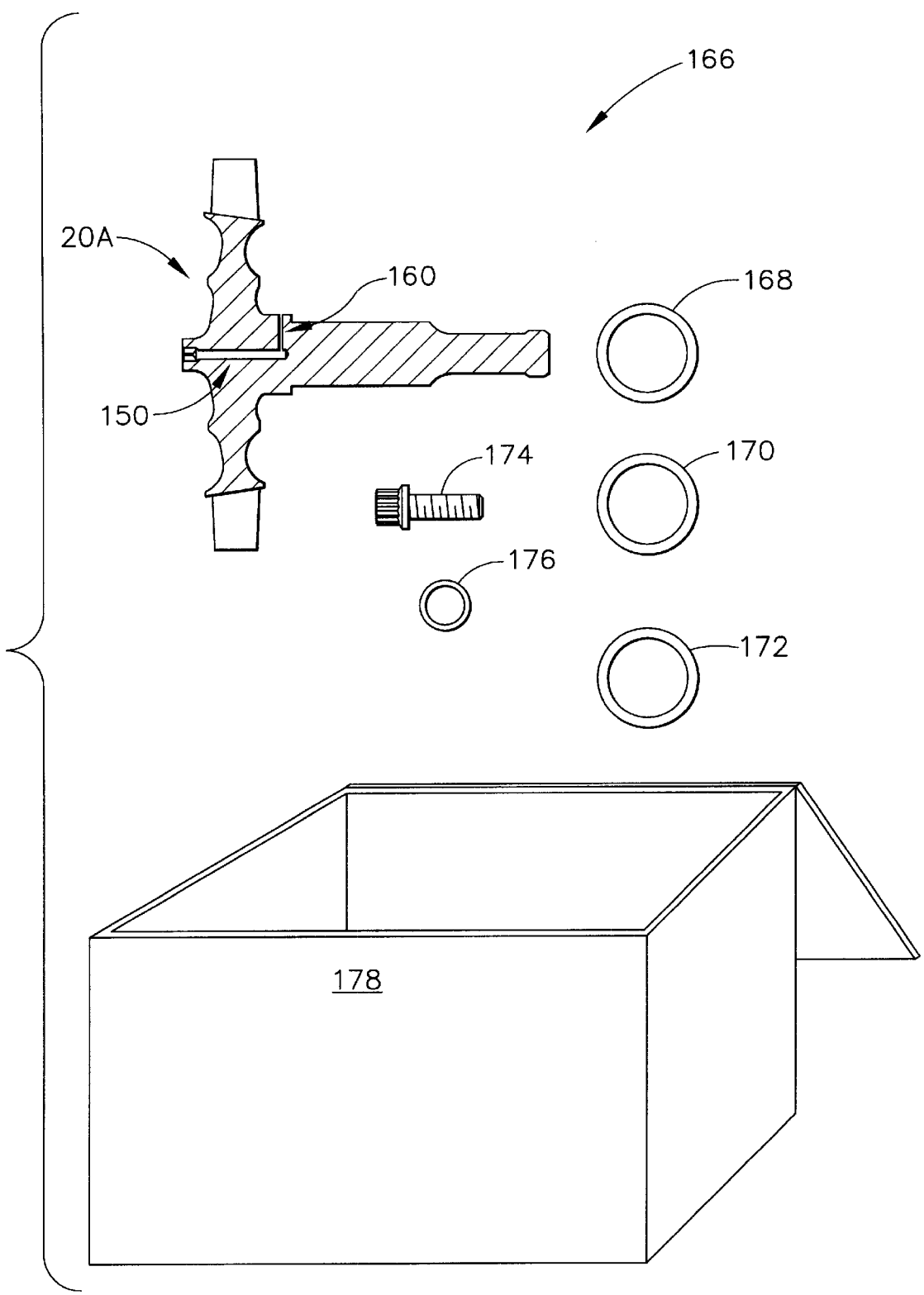
FIG. 8 is an exploded view of a kit and packaging for a kit that can be used in accordance with another aspect of one of the present inventions to provide an improved air turbine starter, for example.

In a further aspect of one of the present inventions, conventional air turbine starters can be rebuilt, and new air turbine starters can be built incorporating one or more aspects of the present inventions, such as the turbine wheel incorporating the conduit described herein using a kit 166 (FIG. 8). In a preferred embodiment, the kit will include the turbine wheel 20A having the first channel 150 formed in the first face of the turbine wheel and the second channel 160 extending from the first channel to the outside surface of the turbine such as at the hub surface between the turbine wheel and the turbine shaft. The kit will also preferably include appropriate other components necessary to install the turbine wheel in an air turbine starter in a manner determined by the particular design of the turbine starter, and such additional components may include seal assemblies and the like. In some turbine starters, the seal assemblies may include a carbon ring 168 for forming a face seal and a seal rotor 170 to be mounted onto the turbine wheel. The seal assembly may also include a seal housing 172, which may incorporate the second seal described above, which may take a number of forms, and any necessary fasteners 174, O-rings 176, and any other components or accessories necessary to reliably install the assembly. The kit may include an appropriate container 178 for shipping, storage or for other purposes.

Conventional air turbine starters can be improved by installing the improved turbine wheels and seal assemblies. Alternatively, they can be improved by removing the existing turbine wheels and forming the desired channel or channels in the turbine wheels and installing the new seal assemblies along with the re-worked turbine wheels.

Various modifications and alterations to the above-described preferred embodiments will be apparent to those skilled in the art. For example, the present inventions can be used with other gas turbine engine configurations. Accordingly, these descriptions of the invention should be considered exemplary and not as limiting the scope and spirit of the invention as set forth in the following claims.

What is claimed is:

1. An air turbine starter comprising:
    a housing defining an inlet, an outlet, and a flow path between the inlet and the outlet for conveying a flow of pressurized air therebetween;
    a turbine disposed in the flow path and having a turbine wheel supported by a turbine shaft supported within the housing by at least one lubricated bearing and producing turbine shaft power, wherein the turbine wheel has an upstream side and a downstream side;
    an output shaft for transmitting the shaft power externally of the starter;
    a gear train coupling the turbine with the output shaft;
    a seal assembly disposed between the at least one lubricated bearing and the turbine wheel and having an upstream side and defining a cavity; and
    a conduit extending from the upstream side of the turbine wheel to the cavity.

2. The air turbine starter of claim 1 wherein the conduit includes a wall defining a bore in the turbine wheel.

3. The air turbine starter of claim 2 wherein the bore is centered along a central axis of the turbine wheel.

4. The air turbine starter of claim 2 wherein the bore is a first bore and wherein the conduit further includes a second wall defining a second bore extending at least partly radially from the first bore to the upstream side of the seal.

5. The air turbine starter of claim 4 wherein the second bore extends exactly radially from the first bore.

6. The air turbine starter of claim 1 wherein the seal assembly includes a first seal and a second seal between the turbine wheel and the first seal for defining a fluid cavity into which the conduit opens.

7. The air turbine starter of claim 6 wherein the second seal is an air seal.

8. The air turbine starter of claim 1 further comprising a turbine shield upstream from the turbine wheel and wherein the turbine shield and the turbine wheel define a buffer cavity and wherein the conduit extends from the buffer cavity to the upstream side of the seal assembly.

9. The air turbine starter of claim 8 wherein the turbine wheel includes a central axis and wherein the conduit includes a first wall defining a first bore coaxial with the central axis and a second wall defining a second bore extending substantially radially outward from the first bore to an edge of the turbine wheel.

10. The air turbine starter of claim 9 wherein the first bore is substantially right circular cylindrical.

11. The air turbine starter of claim of 7 wherein the second seal is one of a multiple knife labyrinth, a lip seal, a clearance floating ring seal, an arch bound floating ring seal, a short static bushing sort, a long static bushing, a wind back, an outside or inside contacting piston ring, a floating free ring, a brush seal, or a face seal.

12. An air turbine starter comprising:

a turbine inlet;

a turbine wheel having an upstream side and a downstream side;

a turbine shaft supporting the turbine wheel for rotation;

a bearing about the turbine shaft downstream from the turbine wheel for supporting the turbine shaft for rotation;

a seal about the turbine shaft and upstream from the bearing for sealing the upstream side of the bearing and having an upstream side and a downstream side having a bearing seal downstream fluid pressure; and a conduit extending from the upstream turbine wheel side to the seal upstream side so that the seal upstream side has a higher pressure than the seal downstream side.

13. The air turbine starter of claim 12 wherein the seal is a first seal and further comprising a second seal upstream from the first seal and defining a cavity into which the conduit opens.

14. The air turbine starter of claim 12 wherein the conduit extends through the turbine wheel.

15. The air turbine starter of claim 14 wherein conduit extends into the turbine wheel along an axis and includes a radially-extending portion.

16. The air turbine starter of claim 15 wherein the radially-extending portion extends outwardly to an edge of the turbine wheel and on the downstream side of the turbine wheel.

17. The air turbine starter of claim 16 wherein the conduit includes a first portion extending along the turbine wheel axis having a first cross-sectional area and wherein the radially-extending portion includes a second cross-sectional area less than the first cross-sectional area.

18. The air turbine starter of claim 12 wherein the conduit includes means extending from the upstream side of the turbine wheel through the turbine wheel to the downstream side of the turbine wheel.

19. An air turbine starter comprising:

a housing defining an inlet at a first pressure, an outlet at a second pressure less than the first pressure, and a flow path between the inlet and the outlet for conveying a flow of air therebetween;

a turbine wheel having vanes disposed in the flow path and wherein the turbine wheel is supported by a turbine shaft supported within the housing by at least one lubricated bearing and producing turbine shaft power, wherein the turbine wheel has an upstream side at a third pressure and a downstream side at a fourth pressure less than the third pressure;

an output shaft for transmitting the shaft power externally of the starter;

a gear train coupling the turbine with the output shaft;

a first seal adjacent the at least one lubricated bearing and between the bearing and the turbine wheel; and a pressure seal spaced from the first seal toward the turbine wheel and having a turbine wheel side and a first seal side for maintaining a pressure difference across the pressure seal; and a second air flow path extending from the upstream side of the turbine wheel at the third pressure to a point between the pressure seal and the first seal.

20. A turbine comprising:

a turbine inlet;

a turbine wheel housing having a wall upstream from the turbine inlet;

a turbine wheel having an upstream side on a side of the housing opposite the turbine inlet and a downstream side;

a shaft for supporting the turbine wheel and extending downstream from the turbine wheel;

a bearing about the turbine shaft for supporting the turbine shaft for rotation;

a first seal about the turbine shaft having an upstream side and a downstream side and upstream from the bearing for sealing an upstream side of the bearing and wherein the bearing has a fluid pressure during normal operation on the upstream side;

a second seal upstream from the first seal and defining a region between the first and second seals;

a conduit through the turbine wheel for supplying fluid to the region between the first and second seals so that a positive pressure differential is created from the upstream side of the first seal to the downstream side of the first seal.

21. The turbine of claim 20 wherein the second seal upstream from the first seal is an air seal and wherein the conduit includes a first wall defining a first bore coaxial with a central axis of the turbine wheel extending from the upstream side of the turbine wheel along the central axis, and a second wall defining a second bore extending substantially radially from the first bore to an outer surface of the turbine wheel on the downstream side of the turbine wheel.

22. The turbine of claim 21 wherein the first and second bores have respective cross-sectional areas wherein the second bore cross-sectional area is less than the first bore cross-sectional area.

23. The turbine of claim of 20 wherein the second seal is one of a multiple knife labyrinth, a lip seal, a clearance floating ring seal, an arch bound floating ring seal, a short static bushing, a long static bushing, or a wind back, an outside or inside contacting piston ring, a floating free ring, a brush seal, and a face seal.

24. A turbine comprising:
   a turbine assembly having a turbine wheel supported on a turbine shaft and wherein the turbine wheel includes an upstream side and a downstream side;
   a seal for sealing around the turbine shaft downstream from the turbine wheel and having an upstream side and a downstream side, wherein a fluid pressure exists on the upstream side of the seal; and
   a fluid conduit extending from the upstream side of the turbine wheel to the downstream side of the turbine wheel and to the upstream side of the seal so that the fluid pressure at the upstream side of the seal is greater than the fluid pressure on the downstream side of the seal so that there is a positive pressure differential from the upstream to the downstream side of the seal.

25. A method for creating a pressure differential across a seal, the method comprising the steps of:
   forming a first bore in a turbine wheel;
   forming a second bore in the turbine wheel intersecting the first bore wherein the first bore opens on an upstream side of the turbine wheel at a first pressure and the second bore opens on a downstream side of the turbine wheel;
   supporting the turbine wheel within a housing through a set of bearings about a turbine wheel shaft;
   providing a first seal for the bearings between the bearings and the turbine wheel; and
   providing a second seal on a side of the second bore opposite the first seal wherein the second seal includes a first side closer to the second bore and a second side farther from the second bore and wherein the second side is exposed to a fluid pressure less than the first pressure.

26. The method of claim 25 wherein the step of forming the first bore includes the step of forming the first bore coaxial with an axis of the turbine wheel.

27. The method of claim 25 further comprising the step of creating a cavity between the first seal and the second seal.

28. The method of claim 25 wherein the step of providing a second seal includes the step of providing one of a multiple knife labyrinth, a lip seal, a clearance floating ring seal, an arch bound floating ring seal, a short static bushing, a long static bushing, or a wind back, an outside or inside contacting piston ring, a floating free ring, a brush seal, and a face seal.

29. A kit for installing an air-to-air seal assembly in an air turbine starter, the kit comprising:
   a turbine wheel having a first face on a first side of the turbine wheel and a hub on a side of the turbine wheel different from the first side and having a hub surface between the turbine wheel and a turbine shaft; and
   a first wall in the turbine wheel and opening at the first face and defining a first channel for allowing air to pass into the first channel; and
   a second wall in the hub defining a second channel for allowing air to pass from the first channel to the surface of the hub.

30. The kit of claim 29 wherein the turbine wheel includes a center portion on the first face and wherein the first channel is formed in the center portion of the first face of the turbine wheel.

31. The kit of claim 29 wherein the turbine wheel includes a central axis and wherein the first channel is formed coaxial with the central axis.

32. The kit of claim 29 wherein the second channel is formed in the hub to extend radially within the hub.

33. The kit of claim 29 wherein the first and second channels have respective first and second cross sectional areas and wherein the first cross sectional area is greater than the second cross sectional area.

34. The kit of claim 29 further including a turbine seal assembly for mounting to a housing portion of a housing for the turbine starter for sealing between the housing portion and at least one of the turbine wheel and the hub.

35. The kit of claim 34 wherein the turbine seal assembly is one of a knife edge, lip, piston ring, floating ring, brush, short bushing and long bushing seal.

36. The kit of claim 34 wherein the turbine seal assembly further includes a face seal for forming a seal for a bearing assembly in the turbine starter.

37. The kit of claim 34 wherein the turbine seal assembly includes a carbon element for a face seal.

38. The kit of claim 34 further including fasteners for mounting the turbine seal assembly.

39. A turbine element comprising:
   a turbine wheel having a first face and a hub having a hub surface between the turbine wheel and a turbine shaft; and
   a first wall in the turbine wheel and opening at the first face and defining a first channel for allowing air to pass into the first channel; and
   a second wall in the hub defining a second channel for allowing air to pass from the first channel to the surface of the hub.

40. A method of improving an air turbine starter seal, the method comprising the steps of:
   creating a bore in the face of a turbine wheel;
   installing a seal assembly; and
   installing the turbine wheel into an air turbine starter.

41. The air turbine starter of claim 12 wherein the seal is a hydrodynamically enhanced mechanical face seal.

42. The air turbine starter of claim 19 wherein the first seal is a hydrodynamically enhanced mechanical face seal.

43. The turbine starter of claim 20 wherein the first seal is a hydrodynamically enhanced mechanical face seal.

44. The method claim 25 wherein the step of providing a first seal includes the step of providing a hydrodynamically enhanced mechanical face seal.

45. The kit of claim 36 wherein the turbine seal is a assembly includes a hydrodynamically enhanced mechanical face seal.

* * * * *